(12) United States Patent
Nakao

(10) Patent No.: US 7,437,999 B2
(45) Date of Patent: Oct. 21, 2008

(54) OVERHEAD TRAVELING VEHICLE SYSTEM

(75) Inventor: Takashi Nakao, Neyagawa (JP)

(73) Assignee: Murata Kikai Kabushiki Kaisha, Kyoto-Shi (JP)

(*) Notice: Subject to any disclaimer, the term of this patent is extended or adjusted under 35 U.S.C. 154(b) by 347 days.

(21) Appl. No.: 11/395,245

(22) Filed: Apr. 3, 2006

(65) Prior Publication Data

US 2006/0219126 A1  Oct. 5, 2006

(30) Foreign Application Priority Data

Apr. 5, 2005 (JP) .............................. 2005-108744

(51) Int. Cl.
*E01B 25/22* (2006.01)

(52) U.S. Cl. .................. 104/106; 414/280; 414/281

(58) Field of Classification Search .................. 104/89, 104/91, 93, 106, 249, 250; 53/247, 538, 53/539; 414/280, 281, 416.07, 591
See application file for complete search history.

(56) References Cited

U.S. PATENT DOCUMENTS 4,402,173 A * 9/1983 Thierion ....................... 53/538
4,648,777 A * 3/1987 Eichenauer .................. 414/591
4,756,657 A * 7/1988 Kinney ........................ 414/281
2004/0126208 A1  7/2004 Tawyer et al.

FOREIGN PATENT DOCUMENTS

| JP | 05-077906 A | 3/1993 |
| JP | 06-293492 A | 10/1994 |
| JP | 11-011843 A | 1/1999 |
| JP | 2005-206371 | 8/2005 |

OTHER PUBLICATIONS

Japanese Office Action dated Apr. 16, 2008 (mailing date), issued in corresponding Japaneses Patent Application No. 2005-108744.

* cited by examiner

*Primary Examiner*—Lars A Olson
(74) *Attorney, Agent, or Firm*—Westerman, Hattori, Daniels & Adrian, LLP.

(57) ABSTRACT

A side buffer 40 is provided on a side of a traveling rail 6 of an overhead traveling vehicle 8. Multiple levels of racks 41, 42 are provided. The overhead traveling means 8 has elevating and lowering means including components such as a linear guide 32 and a ball screw 26 for elevating and lowering a lateral movement unit 16.

4 Claims, 3 Drawing Sheets

OVERHEAD TRAVELING VEHICLE SYSTEM

TECHNICAL FIELD

The present invention relates to an overhead traveling vehicle system. In particular, the present invention relates to improvement in storage capacity for articles.

BACKGROUND ART

In Japanese Patent Application No. 2004-186312, the inventors proposed to provide a buffer in an overhead space on a side of a traveling rail of an overhead traveling vehicle. In the overhead traveling vehicle system, the overhead traveling vehicle is provided with a lateral movement unit for moving an elevation drive unit to move laterally with respect to the traveling rail such that the article is transferred to/from the side buffer. In this respect, the inventors studied to further increase the storage capacity of the side buffer, and achieved the present invention.

SUMMARY OF THE INVENTION

An object of the present invention is to efficiently utilize an overhead space for making it possible to store more articles.

A secondary object of the invention is to provide a system in which even if an article storage unit is provided with inclination in a horizontal surface, it is possible to transfer an article in an orientation adapted to the article storage unit.

A secondary object of the invention is to make it possible to transfer the article to/from a load port or the like with simple control.

A secondary object of the invention is to provide detailed structure for elevating and lowering lateral movement means.

According to the present invention, an overhead traveling vehicle system comprises a traveling rail in an overhead space, an article storage unit provided on a side of the traveling rail, and an overhead traveling vehicle. The overhead traveling vehicle has a hoisting frame for supporting an article, an elevation drive unit for elevating and lowering the hoisting frame, and lateral movement means for laterally moving the elevation drive unit between the article storage unit and a position under the traveling rail. The article storage unit includes at least two levels of racks for placing articles on the racks, the one rack arranged upper and the other rack arranged lower. The overhead traveling vehicle has elevating and lowering means for elevating and lowering the lateral movement means between the height suitable for transfer of the article to/from the lower rack and an original position of the lateral movement means.

It is preferable that means for horizontally rotating the elevation drive unit is provided. It is preferable that the means is provided between the lateral movement means and the elevation drive unit.

Further, it is preferable that, at the time of transferring the article to/from a load port under the traveling rail, the article is transferred by elevating and lowering the hoisting frame using the elevation drive unit without operating the elevating and lowering means.

In particular, it is preferable that the elevating and lowering means comprises at least a pair of elevation guides and a pair of guided bodies provided on front and back sides of the overhead traveling vehicle in the traveling direction, and drive means for driving elevation and lowering of the lateral movement means. The elevation guides are provided on the side of the overhead traveling vehicle, and the guided bodies are provided on the side of an elevated and lowered member such as a lateral movement unit. Alternatively, the elevation guides may be provided on the side of the elevated and lowered member, and the guided bodies may be provided on the side of the overhead traveling vehicle. As the drive means, for example, a ball screw, a belt, a rope, a wire, or a linear motor is used.

Further, it is preferable that, at the time of transferring the article between the lower rack and the hoisting frame, the lateral movement means is moved downwardly to the height suitable for transfer of the article by the elevating and lowering means, and the elevation drive unit and the hoisting frame are moved laterally toward the lower rack by the lateral movement means. For example, the elevating and lowering means and the lateral movement means are controlled by a suitable control unit. In order to move the hoisting frame to the original position, the reverse operation opposite to the above-described operation is carried out. A space is provided between the upper and lower racks so that, for example, the lateral movement means, the elevation drive unit, the hoisting frame, and the article can pass through the space.

In the invention, the article storage unit having multiple levels is provided on a side of the traveling rail. The articles can be stored on the article storage unit at multiple levels and can be transferred to/from the overhead traveling vehicle. Therefore, it is possible to store more articles with the overhead space.

If the elevation drive unit is rotatable horizontally, even if racks of the article storage unit are provided with inclination in the horizontal surface, transfer of the articles can be carried out.

At the time of transferring the article to/from a load port under the traveling rail, if the article is transferred by elevating and lowering the hoisting frame by the elevation drive unit without operating the elevating and lowering means, the control is simple.

If the elevating and lowering means includes elevation guides, guided bodies, and drive means for driving elevation and lowering of the lateral movement means, it is possible to guide the elevation and lowering of the lateral movement means by the elevation guides and the guided bodies, and to drive the elevation and lowering of the lateral movement means by the drive means.

Figure 1:
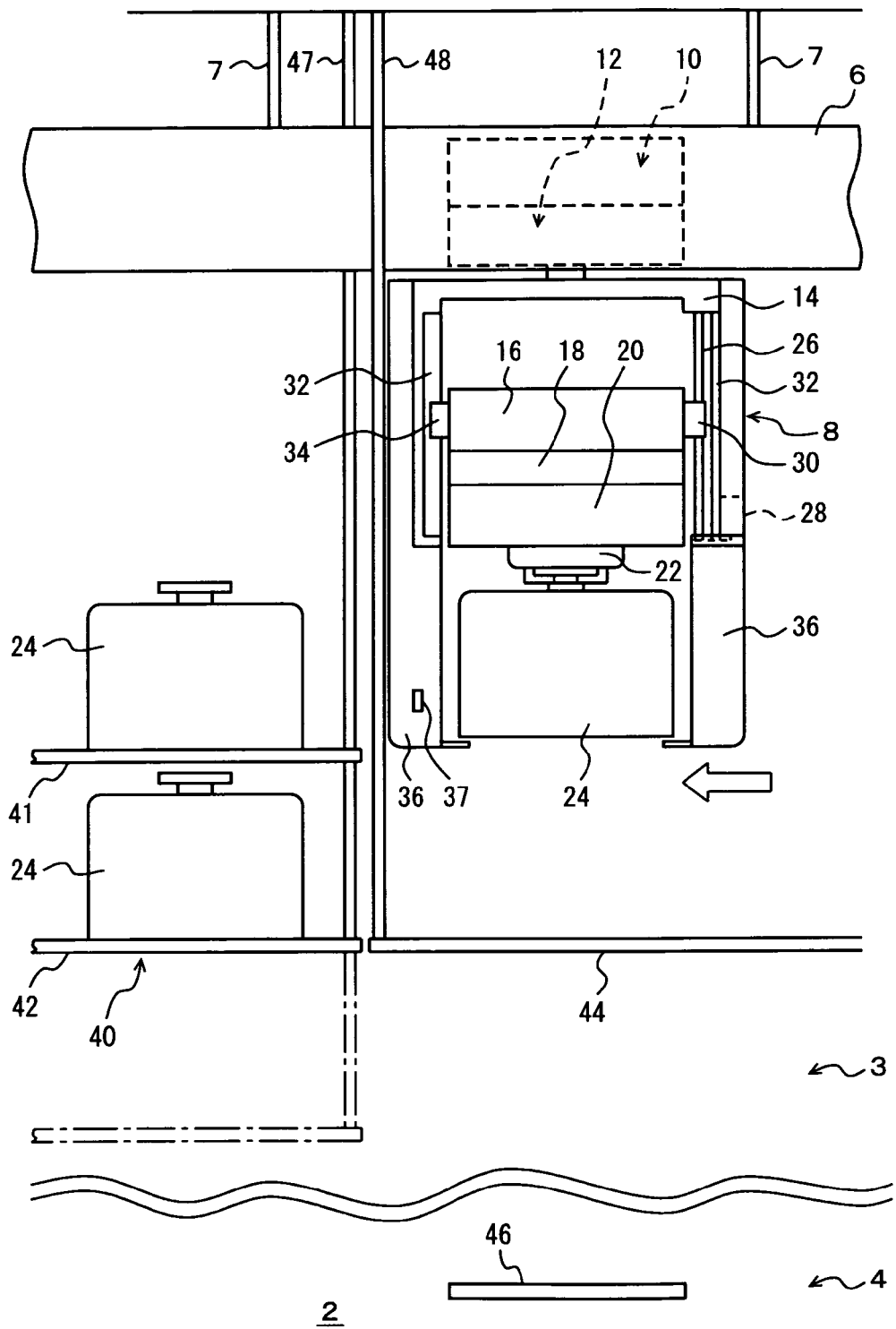
FIG. 1 is a view showing main components of an overhead traveling vehicle system according to an embodiment.

| Brief Description of the Symbols | | | |
|---|---|---|---|
| 2 | Overhead traveling vehicle system | 3 | Overhead space |
| 4 | Ground space | 6 | Traveling rail |
| 7 | Pillar | 8 | Overhead traveling vehicle |
| 10 | Traveling unit | 12 | Power receiving communication |

-continued

Brief Description of the Symbols

| | | | |
|---|---|---|---|
| 14 | Body frame | 16 | Lateral movement unit |
| 18 | θ drive | 20 | Elevation drive unit |
| 22 | Hoisting frame | 24 | Article |
| 26 | Ball screw | 28 | Drive motor |
| 30 | Nut | 32 | Linear guide |
| 34 | Guided body | 36 | Fall prevention cover |
| 37 | Article sensor | 40 | Side buffer |
| 41, 42 | Rack | 44 | Lower buffer |
| 46 | Load port | 47, 48 | Pillar |
| 49 | Kinematic pin | 50 | Ball screw |
| 52 | Frame | 54 | Nut |
| 56 | Belt | 58, 60 | Fixing unit |
| 62 | Ring having gear | 64 | Rotation motor |
| 70 | Side buffer | 71, 72 | Rack |
| 73, 74 | Pillar | | |

EMBODIMENTS

Hereinafter, embodiments in the most preferred form for carrying out the present invention will be described.

An embodiment and its modified embodiment will be described with reference to FIGS. 1 to 5. In the drawings, a reference numeral 2 denotes an overhead traveling vehicle system provided in a clean room or the like. A reference numeral 3 denotes an overhead space, and a reference numeral 4 denotes a ground space under the overhead space. A traveling rail 6 is provided in the overhead space 3. A reference numeral 7 denotes pillars for the traveling rail 6, and a reference numeral 8 denotes an overhead traveling vehicle. The overhead traveling vehicle 8 has a traveling unit 10 which travels inside the traveling rail 6, and a power receiving communication unit 12 for receiving electrical power from the traveling rail 6 in a non-contact manner and communicating with other components utilizing a feeder line or the like as a communication line. A reference numeral 14 denotes a body frame of the overhead traveling vehicle 8, a reference numeral 16 denotes a lateral movement unit, a reference numeral 18 denotes a θ drive, a reference numeral 20 denotes an elevation drive unit, and a reference numeral 22 denotes a hoisting frame. The hoisting frame 22 is provided with a chuck for holding/releasing an article 24 freely. For example, the article 24 is a cassette containing a semiconductor substrate.

A reference numeral 26 denotes a ball screw provided on the side of the body frame 14, and a reference numeral 28 denotes a drive motor for the ball screw. For example, the drive motor 28 is provided under the body frame 14. The lateral movement unit 16 is provided with a nut 30 which elevates and lowers by rotation of the ball screw 26. For example, a pair of linear guides 32, 32 are provided on the front and back sides of the body frame 14 in the traveling direction for guiding guided bodies 34 on the side of the lateral movement unit 16. The ball screw 26, the drive motor 28, the nut 30, the linear guides 32, and the guided bodies 34 form elevating and lowering means for the lateral movement unit 16. The elevating and lowering means elevates and lowers the lateral movement unit 16, the θ drive 18, the elevation drive unit 20, and the hoisting frame 22. A reference numeral 36 denotes fall prevention covers provided on the front and back sides in the traveling direction of the overhead traveling vehicle 8, and claws positioned under the fall prevention covers 36 are pulled into or pulled out of the fall prevention covers 36 for preventing the article 24 from being dropped undesirably. Assuming that the overhead traveling vehicle 8 travels, for example, from the right to the left in FIG. 1, the fall prevention cover on the front side is provided with an article sensor 37 for detecting whether any article has already been stored on upper and lower racks 41, 42 of a side buffer 40. Preferably, the article sensor 37 is rotatable, and the orientation of the detection beam of the article sensor 37 can be changed freely. In the structure, it is possible to determine whether any article has already been stored in the respective upper and lower racks 41, 42.

The side buffer 40 is provided on a side of the traveling rail at a lower position. For example, the side buffer 40 has two levels of racks 41, 42 such that the articles 24 can be stored on the upper rack 41 and the lower rack 42 in a vertically overlapping manner. As shown by chain lines in FIG. 1, three or more levels of racks may be provided. On the rack 41, the height of the bottom surface of the article 24 is slightly lower than the height of the bottom surface of the article which is being transferred by the overhead traveling vehicle 8. If the elevation and lowering stroke with the elevating and lowering means comprising the ball screw 26, the linear guide 32, or the like is substantially equal to the height of one article 24, both of the articles 24 arranged in the two levels of the racks 41, 42 of the buffer 40 can be transferred. If the elevation and lowering stroke is substantially equal to the total height of two articles 24, even if the articles 24 are arranged in three levels on the side buffer 40, the articles 24 can be transferred.

A reference numeral 44 denotes a lower buffer provided just below the traveling rail 6. A reference numeral 46 denotes a load port for a processing apparatus (not shown). Though the lower buffer 44 and the load port 46 are vertically overlapped in FIG. 1, the positions of the lower buffer 44 and the load port 46 in a plan view are not overlapped with each other such that the lower buffer 44 and the load port 46 do not contact each other. A reference numeral 47 denotes a pillar of the side buffer 40, and a reference numeral 48 denotes a pillar of the lower buffer 44.

Figure 2:
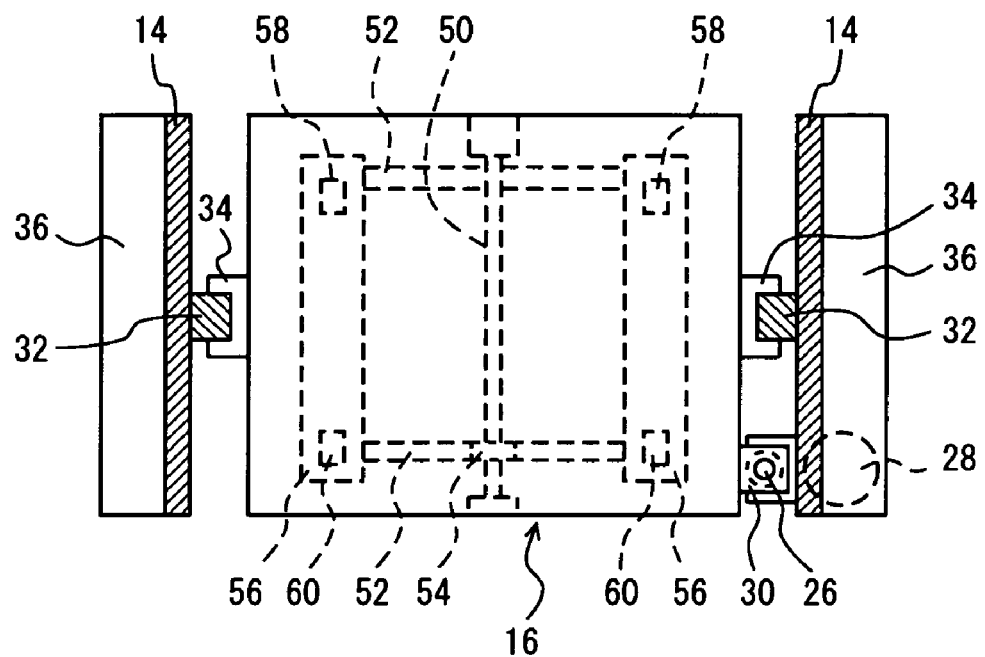
FIG. 2 is a partial cross sectional view showing an overhead traveling vehicle used in the embodiment, taken along an upper portion of a lateral movement unit in a horizontal direction.

FIG. 2 shows a pair of linear guides 32 and a pair of guided bodies 34 provided on both front and back sides of the overhead traveling vehicle in the traveling direction. The numbers of the liner guides 32 and the guided bodies 34 may be increased. Further, the linear guides 32 may be provided on the side of the lateral movement unit 16, and the guided bodies 34 may be provided on the side of the body frame 14. In the embodiment, the ball screw 26, the motor 28, and the nut 30 are provided on one of the front and back sides in the traveling direction. These components may be provided on both of the front and back sides in the traveling direction.

Next, the mechanism of the lateral movement unit 16 will be described. A reference numeral 50 denotes a ball screw, and a reference numeral 54 denotes a nut attached to frames 52. Belts 56 are in mesh with pulleys fixed to the frames 52. Fixing units 58 of the belts 56 are fixed to the lateral movement unit 16, and fixing units 60 are fixed to the θ drive 18. In the structure, when the ball screw 50 is driven to move the nut 54, the frame 52 is moved, and the fixing units 60 is moved by the stroke which is twice as large as that of the nut 54. As a result, the θ drive 18 moves laterally relative to the lateral movement unit 16.

Figure 3:
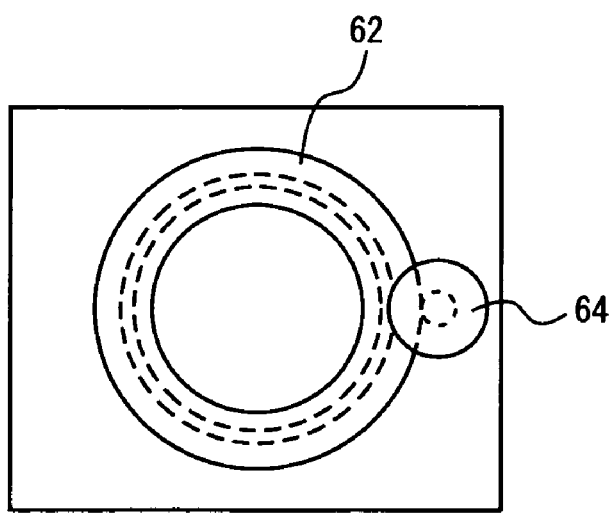
FIG. 3 is a view showing structure of a θ drive of the overhead traveling vehicle used in the embodiment.

In the θ drive 18 shown in FIG. 3, the elevation drive unit is fixed to the lower side of a ring 62 having a gear, the ring 62 is rotated by a rotation motor 64 to change the orientation of the elevation drive unit. It is not required that the elevation drive unit is rotatable 360°. It is sufficient that the elevation drive unit can be rotated through a predetermined angle.

At the time of transferring the article 24 to/from the lower rack 42 of the side buffer 40, the lateral movement unit 16 is moved downwardly using the elevating and lowering means such as the ball screw 26, and then, the θ drive 18, the elevation drive unit 20, and the hoisting frame 22 are laterally moved to a position above the rack 42 using the lateral movement unit 16. Then, the hoisting frame 22 is elevated and lowered for transferring the article 24. The last elevation and lowering of the hoisting frame may be carried out by the elevation drive unit 20, or may be carried out by elevating and lowering means such as the ball screw 26. The hoisting frame 22 returns from the rack 42 by the reverse operation. At the time of transferring the article to/from the upper rack 41 of the side buffer 40, for example, without using the elevating and lowering means, the lateral movement unit 16 is used for laterally moving the θ drive 18, the elevation drive unit 20, and the hoisting frame 22 to the position above the rack 41. Then, the hoisting frame 22 is elevated and lowered for transfer of the article 24. Instead of this operation, the lateral movement unit 16 may move the θ drive 18, the elevation drive unit 20, and the hoisting frame 22 laterally to the position above the rack 41, and then, the elevating and lowering means such as the ball screw 26 may elevate and lower the hoisting frame 22. The backward movement of the hoisting frame into the overhead traveling vehicle 8 can be carried out by the reverse operation.

At the time of transferring the article to/from the load port 46, only the elevation drive unit 20 is used for elevating and lowering the hoisting frame without using the elevating and lowering means. Therefore, control for the transfer is simplified. Further, at the time of transferring the article to/from the lower buffer 44, if only the elevation drive unit 20 is used without the elevating and lowering means, the control is simple. For example, in the case of aligning the bottom surface of the article of the lower buffer 44 with the bottom surface of the lower rack 42, transfer of the article can be carried out only using the elevating and lowering means such as the ball screw 26.

Figure 4:
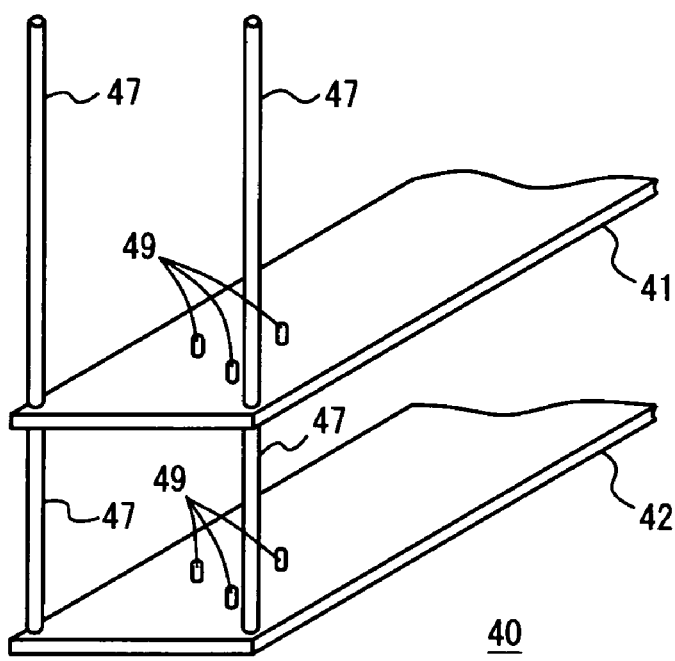
FIG. 4 is a perspective view showing a side buffer used in the embodiment.
Figure 5:
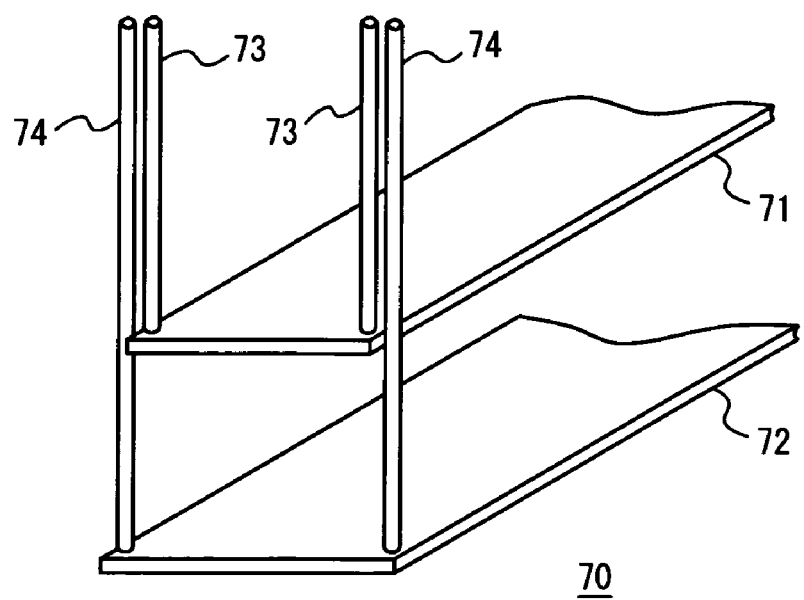
FIG. 5 is a perspective view showing a side buffer according to a modified embodiment.

As shown in FIG. 4, each of the racks 41 and 42 is provided with kinematic pins 49 or the like so that the kinematic pins 49 engage grooves formed at the bottom or the like of the article to carry out the guiding operation. Further, each of the racks 41, 42 may be provided with components such as an ID reader, a color tape, a communication terminal, and a memory. When the overhead traveling vehicle detects whether any product is stored in the rack, the color tape may indicate that no article is stored in the rack. The communication terminal is used for communication with the overhead traveling vehicle. Even if the angles of mounting three kinematic pins 49 are deviated from standard values, such deviation can be eliminated by rotating the hoisting frame 22 using the θ drive 18 of the overhead traveling vehicle 8 through the elevation drive unit 20. In FIG. 4, the upper rack 41 and the lower rack 42 are supported by the common pillars 47. As shown in FIG. 5, an upper rack 71 of a side buffer 70 may be supported by pillars 73, and a lower rack 72 of a side buffer 70 may be supported by pillars 74, separately.

In the embodiment, the lateral movement unit 16 is elevated and lowered using the ball screw 26. Alternatively, the lateral movement unit 16 may be elevated and lowered by a belt, a rope, a wire, a linear motor, or the like. In the embodiment, the θ drive 18 is only moved outwardly or inwardly on one side of the traveling rail using the lateral movement unit 16. Therefore, the space on the other side surface of the lateral movement unit 16 is available. Thus, the linear guide 32, the ball screw 26, or the like may be provided in the space. Further, the θ drive 18 may not be provided.

In the embodiment, the following advantages can be obtained. (1) Since it is possible to place the articles on multiple levels of racks of the side buffer 40, the storage capacity for articles in the overhead traveling vehicle system is increased. (2) Since the lateral movement unit is elevated and lowered by the elevating and lowering means, transfer of the article can be carried out directly to/from the rack in an arbitral level of the side buffers. (3) Since the orientation of the article can be changed by rotating with the θ drive 18, even if the kinematic pins 49 are arranged with inclination, transfer of the article can be carried out suitably. (4) At the time of transferring the article to/from the load port 46, the hoisting frame is elevated and lowered only by the elevation drive unit 20 without using the elevating and lowering means. Therefore, the control is simplified. Also in the case of transferring the article to/from the lower buffer 44, if the article is transferred only using the elevation drive unit 20 without using the elevating and lowering means, the control is simple. Further, in the case of aligning the bottom surface of the article on the lower buffer 44 with the bottom surface of the lower rack 42, the article may be transferred only using the elevating and lowering means such as the ball screw 26.

The invention claimed is:

1. An overhead traveling vehicle system comprising: a traveling rail in an overhead space; an article storage unit provided on a side of the traveling rail; and an overhead traveling vehicle, the overhead traveling vehicle having: a hoisting frame for supporting an article; an elevation drive unit for elevating and lowering the hoisting frame; and lateral movement means for laterally moving the elevation drive unit between the article storage unit and a position under the traveling rail, wherein:

the article storage unit includes at least two levels of racks for placing articles on the racks, the one rack arranged upper and the other rack arranged lower;

the overhead traveling vehicle has elevating and lowering means for elevating and lowering the lateral movement means between the height suitable for transfer of the article to/from the lower rack and an original position of the lateral movement; and at the time of transferring the article to/from a load port under the traveling rail, the article is transferred by elevating and lowering the hoisting frame using the elevation drive unit without operating the elevating and lowering means.

2. The overhead traveling vehicle system of claim 1, further comprising means for horizontally rotating the elevation drive unit.

3. The overhead traveling vehicle system of claim 1, wherein the elevating and lowering means comprises: at least a pair of elevation guides and a pair of guided bodies provided on front and back sides of the overhead traveling vehicle in the traveling direction; and drive means for driving elevation and lowering of the lateral movement.

4. The overhead traveling vehicle system of claim 1, at the time of transferring the article between the lower rack and the hoisting frame, the lateral movement means is lowered to the height suitable for transfer of the article by the elevating and lowering means, and the elevation drive unit and the hoisting frame are moved laterally toward the lower rack by the lateral movement means.

* * * * *